Feb. 26, 1974  H. M. RHODES  3,794,583
METHOD AND APPARATUS FOR SEPARATING OIL
FROM AN OIL WATER MIXTURE
Filed Aug. 28, 1972  3 Sheets-Sheet 1

United States Patent Office 3,794,583
Patented Feb. 26, 1974

3,794,583
METHOD AND APPARATUS FOR SEPARATING OIL FROM AN OIL WATER MIXTURE
Herbert M. Rhodes, New Orleans, La., assignor to Oil Mop, Inc., New Orleans, La.
Filed Aug. 28, 1972, Ser. No. 284,089
Int. Cl. B01d 13/00
U.S. Cl. 210—23
11 Claims

ABSTRACT OF THE DISCLOSURE

The present disclosure is directed to a method and apparatus for separating oil from an oil and water mixture by first subjecting the mixture to passage through a chamber containing an oil mop structure made from fibrillated strips of polypropylene secured to a polypropylene line so that the oil will be attracted by the polypropylene strips and the water will pass through the mop structure and will thereafter be subjected to passage through a fabric membrane having a two percent fluorocarbon solution impregnating the fabric which will permit passage of the water through the membrane rejecting the oil and permitting the water to pass on and be drawn off separately from the oil which may likewise be drawn separately from the chamber.

---

An object of the present invention is to provide a method and structure for separating oil from an oil water mixture on a continuous flow basis where the mixture is introduced into the chambers of the apparatus and at a primary and secondary stage the mixture is subjected to first an oil mop structure of the type described in my prior Pat. No. 3,668,118 and the water passing through the mop zone is then introduced to a second chamber after passing through a membrane of fabric or the like which has been impregnated with a two percent or more fluorocarbon solution which rejects the oil and passes the water. The water is thereafter removed from the second chamber and of course the oil is drawn off from the first chamber and prior to the commencement of the second chamber the upper portion of which is defined by the fabric membrane having the fluorocarbon impregnated therein.

At still further object of the present invention is to provide a continuous flow separation method and apparatus which may be accelerated by the introduction of an air purge below the mop structure area in the first chamber and below the fluorocarbon impregnated fabric in the second chamber.

A still further object of the present invention is the provision of a continuous linear flow of a mixture of oil and water whereby only the water may be discharged over board when this equipment is used with ship board bilge pump, an oil rig or where a drainage canal is being cleaned and the oil removed therefrom. This invention is applicable to the food processing industry for removing animal and vegetable oils from processing solutions.

With the foregoing and other objects in view the invention will be more fully described hereinafter and more particularly pointed out in the appended claims.

In the drawings in which like parts are denoted by like reference characters throughout the several views.

Figure 1:
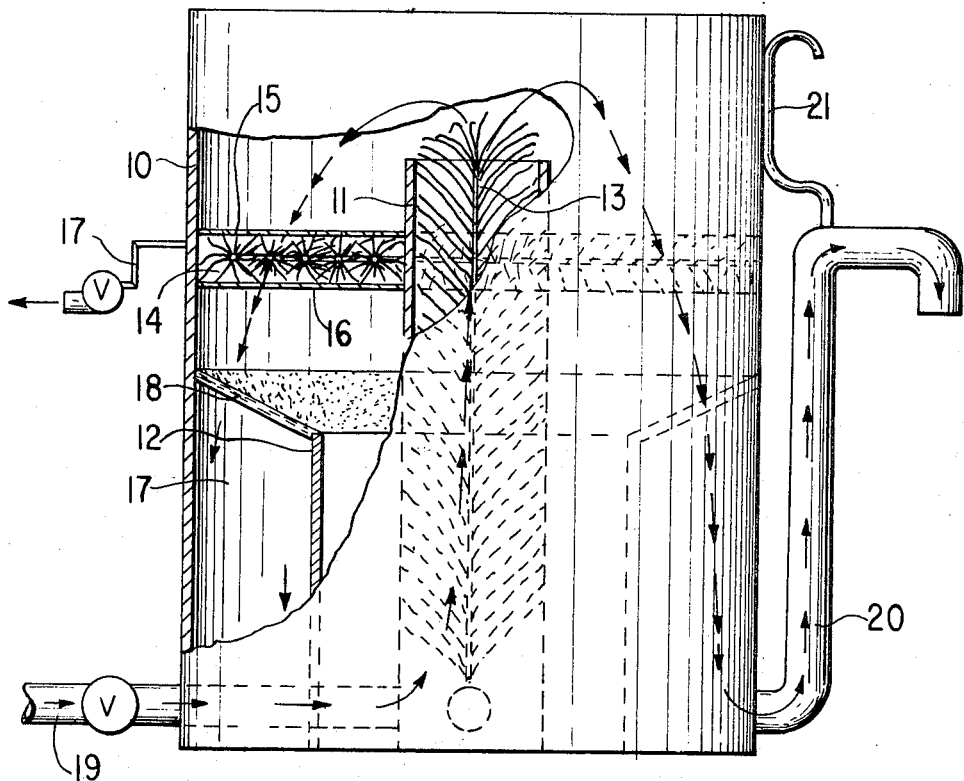
FIG. 1 is a side elevational view of one embodiment of the present invention with parts broken away and parts shown in section in a simplified form of two chamber arrangement.
Figure 2:
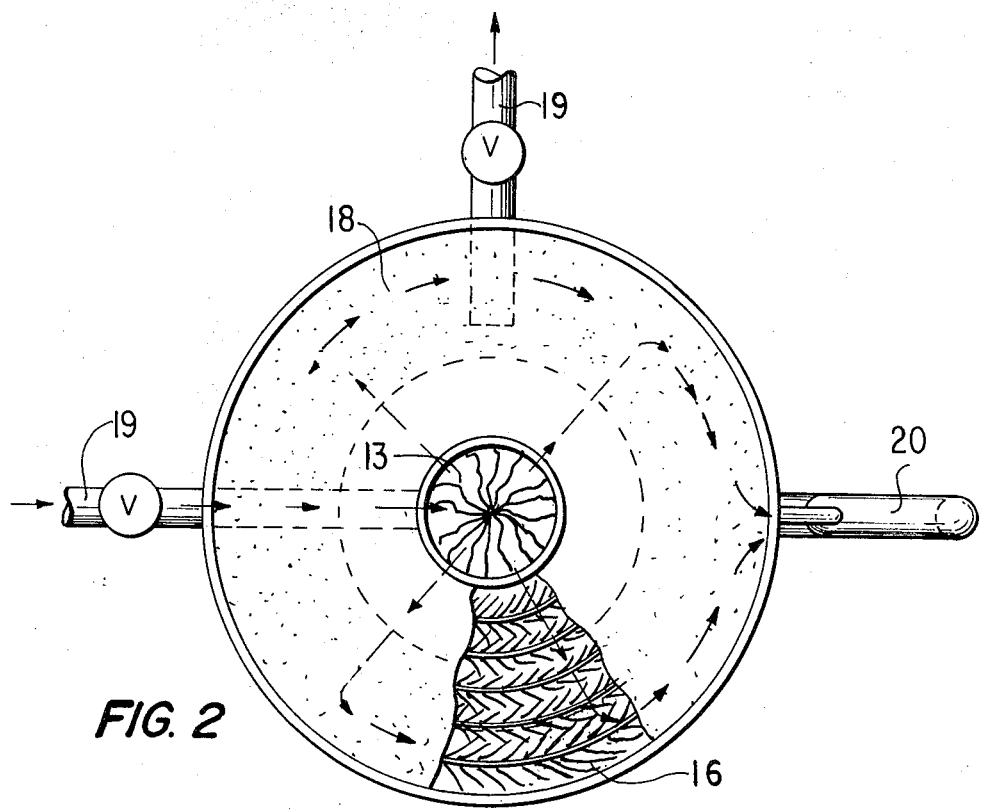
FIG. 2 is a top plan view of the structure of FIG. 1.

Referring now to the drawings 10 designates a cylindrical container having there within a concentric tube 11 and a second concentric tube 12. Located within the tube 11 is an oil mop structure 13 similar to the oil mop structure shown and described in my prior Pat. 3,668,-118. At the upper portion of the container 10 is a helical serpentine winding of oil mop structure 14 which is retained by foraminous plates 15 and 16 and is provided with an oil outlet 17. The second concentric tube 12 defines between the container 10 and the concentric tube 12 a second chamber 17 which is defined with a fabric membrane 18 which has been impregnated with a two percent fluorocarbon solution which will pass water but reject oil.

The inlet or supply side of the container 10 has a inlet pipe 19 controlled by a valve for supplying a mixture of oil and water to the inner concentric tube 11 which oil and water will pass upwardly through the mop structure 13 and over into the upper portion of the upper chamber across the foraminous plates 15 and 16 and over the helically wound oil mop structure 14 where a major portion of the oil in the co-mixture will be trapped. Thereafter the water will pass through the mop structure 14 and come into contact with the fabric membrane 18 and oil will be separated and the water will be passed into the lower chamber where it will be drawn off through pipe arrangement 20 having an air vent 21.

Figure 3:
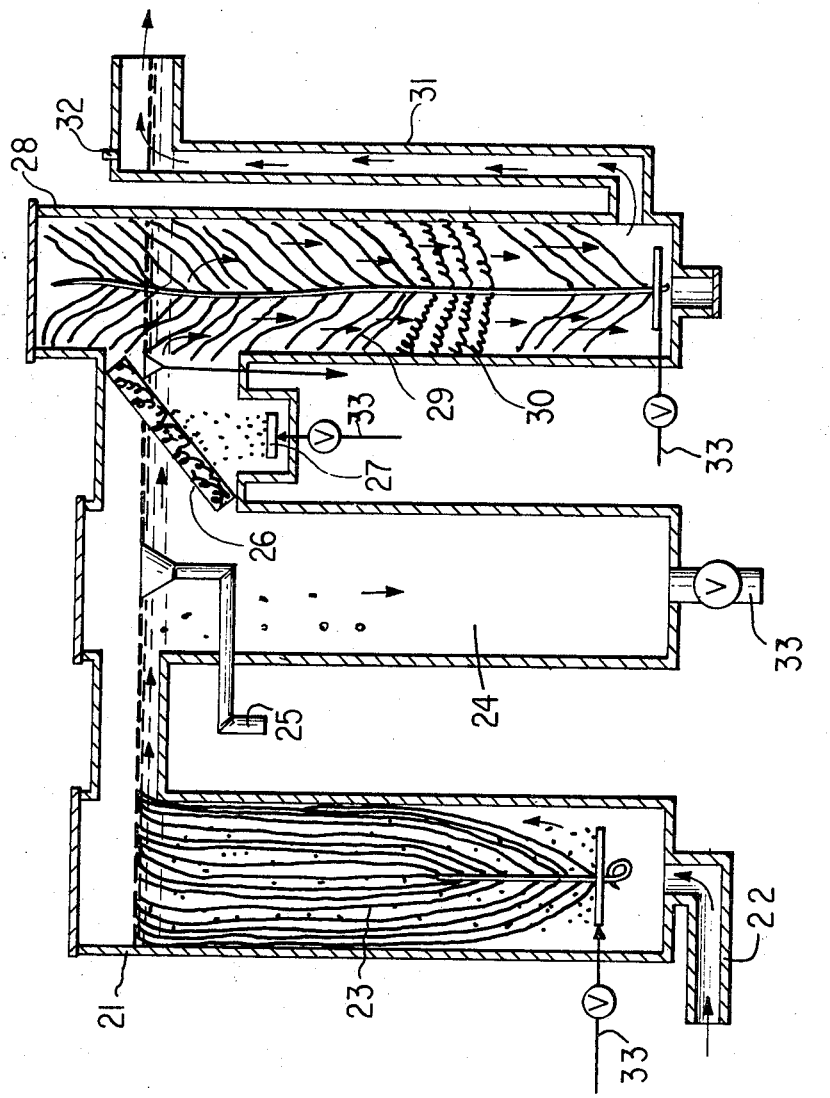
FIG. 3 is a schematic of a second form of the invention empolying a horizontal distribution system as distinguished from the vertical system of FIG. 1.

Referring now to FIG. 3 a modified form of the invention is shown in which a chamber 21 has suspended therein an oil mop structure of fibrillated strips of polypropylene 23 and an intake 22 at the bottom thereof for the introduction of an oil water mixture to the chamber 21. The mixture being introduced at the bottom and rising to the top and the oil being attracted to the polypropylene 23 will cause the major portion of the oil to float on the surface of the mixture at the top of the chamber 21 and in its horizontal path the oil will be drawn off through a wier line 25 below which foreign particles and dust and dirt will settle through the chamber 24. Arranged in advance of the chamber 28 is the fabric membrane 26 which is impregnated with a two percent fluorocarbon solution which rejects the oil and passes water. After the mixture has passed the membrane 26 and continues to move from left to right in FIG. 3 the water will still contain a small amount of oil and when entering chamber 28 will be caused to pass through a modified form of oil mop structure 29 which has a zone of fabric strips 30 which have been impregnated with a two percent fluorocarbon solution after going through the chamber 28 and being subjected to the two different media 29 and 30 the water will be drawn off through line 31 which has an air vent 32. In each of the zones an air purge to activate the action between the oil and the fibrous material suspended in the system is shown at 33. This may be air or natural gas or any inert gas which will by bubbling action induce a reaction between the oil in the mixture and the suspended filament whether it be the fibrillated polypropylene fibers of the oil mop or the strips of fabric which have been impregnated with the fluorocarbon.

Figure 4:
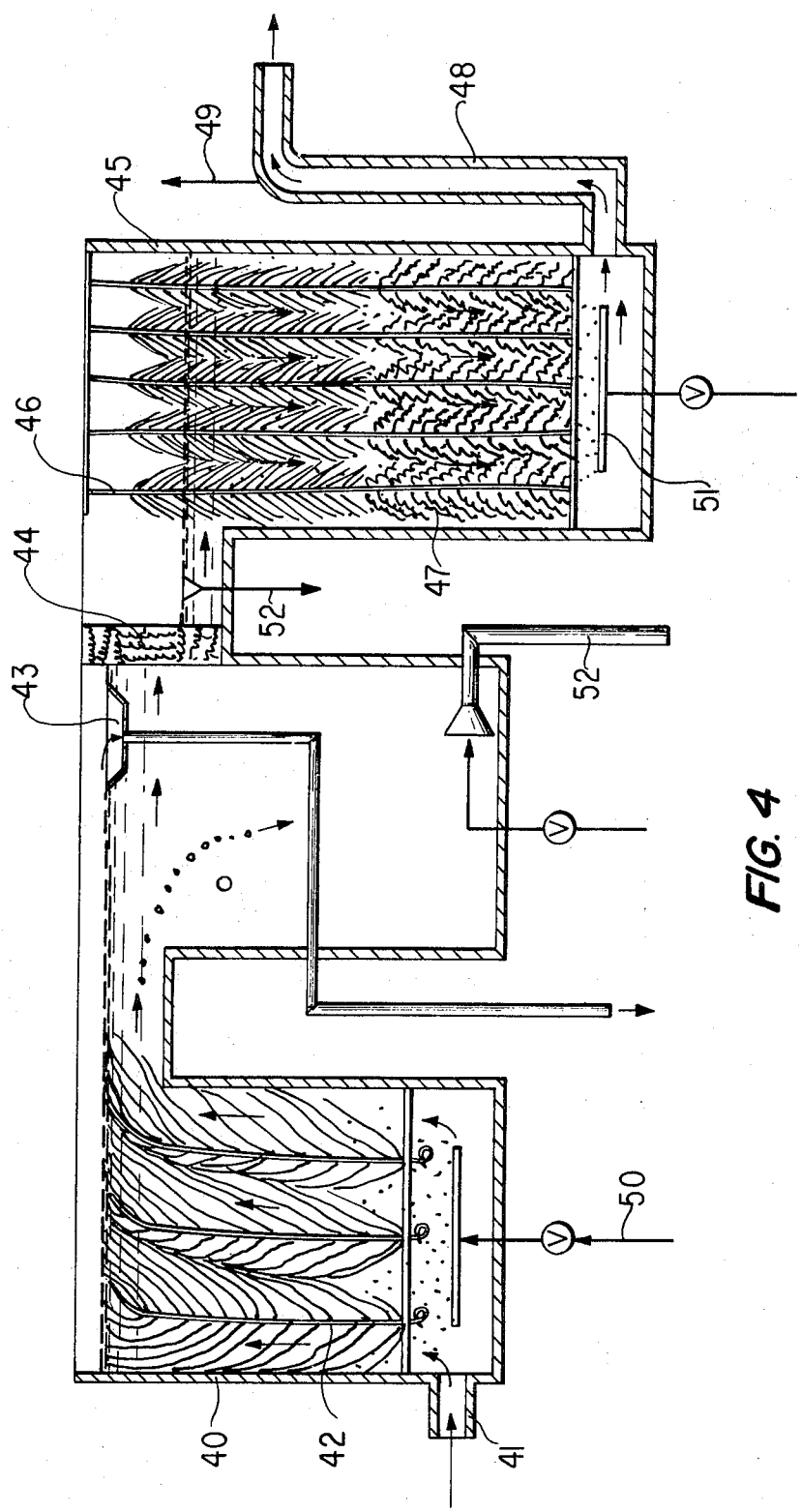
FIG. 4 is a schematic of a further modified form of the invention of FIGS. 1 and 3.

Referring now to FIG. 4 the chamber 40 at the left hand side of FIG. 4 has an inlet line 41 for receiving a mixture of oil and water. Suspended within the chamber 40 are a plurality of oil mop structures of fibrillated polypropylene 42. The path of the mixture flow is upwardly through the chamber 40 thence to the right and over into a second zone where a weir 43 is provided for draining off the oil floating at the top of the mixture. The dirt, dust and foreign material entrained in the mixture is settled out in this intermediate chamber and removed through the line 52 and the oil-water mixture then proceeds to the right in FIG. 4 and passes through a membrane or fabric zone 44 which fabric has been impregnated with a two percent fluorocarbon solution and may be of a treated material such as cotton muslin. The mixture passing through the membrane 44 then enters the chamber 45 in which is suspended a plurality of oil mop structures 46 which are modified in that a portion of each oil mop strip contains fibrillated polypropylene fibers and fabric strips 47 which have been impregnated with the fluorocarbon. The water then passes from the bottom of the chamber 45 through a water discharge line 48 having a vent 49. As described in the embodiment of FIG. 3 the activity in each of the chambers is accelerated by an air purge which is introduced at 50 and 51 to facilitate the reaction between the suspended media within the chamber and the oil and oil water passing therethrough.

Figure 5:
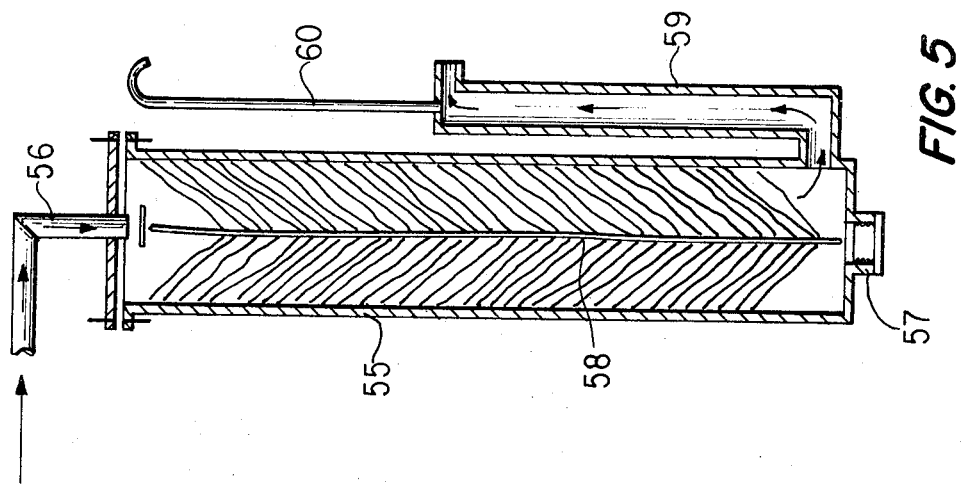
FIG. 5 is a vertical section taken through the basic element of the oil water separation structure of the present invention.

Referring now to FIG. 5 an elemental or basic oil-water separation unit is shown as comprising a pipe or tubing 55 having a cap with an inlet or supply line 56 for introducing a mixture of oil and water on a gravity flow basis. The bottom of the pipe 55 has a removable end 57 which will permit the removal of an oil mop structure 58 which is snugly fit into the tube 55. This structure is a length of oil mop of fibrillated strips of polypropylene as described in my Pat. 3,668,188. Separated water will be drawn off through line 59 which has an air vent 60. The removable end 57 is removed and the mop structure 58 is pulled out of the tube 55 and the oil removed by squeezing or cleaning and the cap 56 is removed and the mop 58 is pulled through the tube and both ends of the tube closed by replacement of ends 56 and 57 and the unit is ready for reuse.

What I claim is:

1. An apparatus for separating oil from an oil and water mixture comprising:
    (a) chamber means through which the mixture of oil and water is passed,
    (b) a mass of fibrillated polypropylene strips secured to a polypropylene line positioned in said chamber to be in the path of flow of said oil-water mixture,
    (c) a fibrous mass impregnated with a fluorocarbon for rejecting oil but passing water positioned downstream of said polypropylene mass,
    (d) means downstream of said fibrous mass to remove only water from said chamber, and
    (e) means between said polypropylene mass and said fibrous mass for removing only oil separated from said oil-water mixture.

2. The apparatus of claim 1 further comprising means for removing dirt and foreign matter by gravity separation between said polypropylene mass and fibrous mass impregnated with fluorocarbon.

3. The apparatus of claim 1 wherein said mass of fibrillated polypropylene is a length of oil mop helically wound across the chamber and supported by a perforate member.

4. The apparatus of claim 1 wherein said fibrous mass is a woven fabric impregnated with a 2 to 5 percent fluorocarbon.

5. The apparatus of claim 1 wherein the means for separating the water comprises a second chamber means the upstream end of which supports said fibrous mass.

6. The apparatus of claim 1 further comprising gaseous fluid purge means positioned beneath said mass of polypropylene to bubble through the mixture.

7. The apparatus of claim 1 further comprising gaseous fluid purge means positioned beneath said fibrous mass impregnated with fluorocarbon to bubble through the mixture.

8. An apparatus for separating oil from an oil and water mixture comprising:
    (a) a tubular chamber sealable at both ends,
    (b) a length of oil mop having a central line and fibrillated strips of polypropylene extending off same and defining a compressed mass within the tubular chamber,
    (c) means at the top of said chamber for introducing the oil-water mixture into the chamber for passage through the mop, and
    (d) means at the bottom of the tubular chamber for drawing off the water separated from the mixture incident to passage of the mixture through the compressed mass of the oil mop.

9. The method of separating oil from an oil-water mixture comprising:
    (a) passing the oil-water mixture through a mass of fibrillated polypropylene and removing a major portion of the oil from the oil-water mixture,
    (b) subjecting the resultant mixture to passage through a fibrous mass of fabric which has been impregnated with 2% fluorocarbon which passes the water but rejects the oil, and
    (c) drawing off the oil and water separately.

10. The method of claim 9 further comprising purging the mixture passing through both the mass of polypropylene and the mass of fabric impregnated with fluorocarbon with a fluid gaseous flow to bubble through the mixture.

11. An apparatus for separating oil from an oil and water mixture comprising:
    (a) chamber means through which the mixture of oil and water is passed,
    (b) a mass of fibrillated polypropylene strips positioned in said chamber to be in the path of flow of said oil-water mixture,
    (c) a fibrous mass impregnated with a fluorocarbon for rejecting oil but passing water positioned downstream of said polypropylene mass,
    (d) means to one side of said fibrous mass to remove only water from said chamber, and
    (e) means to the other side of said polypropylene mass and said fibrous mass for removing only oil separated from said oil-water mixture.

References Cited

UNITED STATES PATENTS

| | | | |
|---|---|---|---|
| 1,453,169 | 4/1923 | Packer | 210—300 X |
| 3,199,676 | 8/1965 | May | 210—315 X |
| 3,535,235 | 10/1970 | Schouw | 210—30 |
| 3,558,482 | 1/1971 | De Young | 210—23 |
| 3,617,548 | 11/1971 | Willihnganz | 210—23 |

SAMIH N. ZAHARNA, Primary Examiner

R. H. SPITZER, Assistant Examiner

U.S. Cl. X.R.

210—40, 300, 315, DIG. 5, DIG. 21